(12) United States Patent
Yang et al.

(10) Patent No.: US 12,473,580 B1
(45) Date of Patent: *Nov. 18, 2025

(54) ONE-STEP METHOD FOR SYNTHESIZING AMOXICILLIN FROM PENICILLIN OR SALT THEREOF THROUGH ENZYME CATALYSIS

(71) Applicant: XINGZHI COLLEGE ZHEJIANG NORMAL UNIVERSITY, Jinhua (CN)

(72) Inventors: Zhonghua Yang, Jinhua (CN); Xiaoyan Yin, Jinhua (CN)

(73) Assignee: XINGZHI COLLEGE ZHEJIANG NORMAL UNIVERSITY, Lanxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,316

(22) Filed: Apr. 25, 2025

(30) Foreign Application Priority Data

Oct. 8, 2024 (CN) .......................... 202411396024.3

(51) Int. Cl.
*C12N 9/84* (2006.01)
*C07D 499/68* (2006.01)
*C12P 37/00* (2006.01)

(52) U.S. Cl.
CPC ............ *C12P 37/00* (2013.01); *C07D 499/68* (2013.01); *C12N 9/84* (2013.01)

(58) Field of Classification Search
CPC .......................... C12Y 305/01011; C12N 9/84
See application file for complete search history.

(56) References Cited

U.S. PATENT DOCUMENTS 8,247,192 B2 * 8/2012 Behrouzian ............... C12P 7/22 435/325

FOREIGN PATENT DOCUMENTS

| CN | 103695447 | A | 4/2014 |
| CN | 104789510 | A | 7/2015 |
| CN | 107937472 | A | 4/2018 |
| CN | 108949736 | A | 12/2018 |
| CN | 109371095 | A | 2/2019 |
| CN | 111051506 | A | 4/2020 |
| CN | 119020335 | A | 11/2024 |
| WO | 2022195603 | A1 | 9/2022 |

OTHER PUBLICATIONS

Pechmann et al. "Interplay between Chaperones and Protein Disorder Promotes the Evolution of Protein Networks" PLoS Comput Biol 10(6): e1003674. doi: 10.1371/journal.pcbi.1003674, 2013, 15 pages (Year: 2014).*
Ni et al. (2022) Immobilization and Evaluation of Penicillin G Acylase on Hydroxy and Aldehyde Functionalized Magnetic α-Fe2O3/Fe3O4 Heterostructure Nanosheets. Front. Bioeng. Biotechnol. 9:812403., 2022, 9 pages (Year: 2022).*
Zhang et al. "Rates of Conservative and Radical Nonsynonymous Nucleotide Substitutions in Mammalian Nuclear Genes" J Mol Evol (2000) 50:56-68 (Year: 2000).*
USPTO Sequence Search for SEQ ID No. 1, alighment results against U.S. Pat. No. 8,247,192 (Year: 2025).*
Chen Jian Bo, et al. The pH-dependent Catalytic Reaction of Penicillin G Acylase and Its Mutants, Acta Biochimica et Biophysica Sinica, 2022, pp. 789-789, vol. 34 No. 6.
Wynand B. L. Alkema, et al., The role of hydrophobic active-site residues in substrate specificity and acyl transfer activity of penicillin acylase, Eur. J. Biochem., 2002, pp. 2093-2100, vol. 269.
J. Sambrook and M.R. Green, Molecular Cloning: A Laboratory Manual, 2013, pp. 73-76, 126-130, 365-373, Science Press.
Andria L.Deaguero, et al., Improving the diastereoselectivity of penicillin G acylase for ampicillin synthesis from racemic substrates, Protein Engineering, Design & Selection, 2012, pp. 135-144, vol. 25 No.3.

* cited by examiner

*Primary Examiner* — Thane Underdahl
(74) *Attorney, Agent, or Firm* — Bayramoglu Law Offices LLC (57) ABSTRACT

A one-step method for synthesizing amoxicillin from penicillin or a salt thereof through an enzyme catalysis is provided. Conventional amoxicillin production requires sequential use of distinct penicillin acylases for hydrolysis and synthesis steps, necessitating isolation of the intermediate 6-aminopenicillanic acid (6-APA) and resulting in elevated manufacturing costs and suboptimal process efficiency. To address these limitations, the inventive method utilizes a mutant of penicillin acylase derived from *Kluyvera citrophila* as the exclusive biocatalyst in an aqueous reaction system. By reacting penicillin G potassium salt with D-p-hydroxyphenylglycine methyl ester, the process achieves direct amoxicillin synthesis in a single enzymatic step, attaining a product yield of 99%. This method exhibits advantages including fast catalytic rate, high product yield, environmentally friendly pure aqueous reaction system, low cost, and excellent economic benefits.

7 Claims, 4 Drawing Sheets

Specification includes a Sequence Listing.

| | |
|---|---|
| 1 | MKNRN PMIVN GIVTS LICCS SLSAL AASPP TEVKI VRDEY GMPHI YADDT |
| 51 | YRLFY GYGYV VAQDR LFQME MARRS TQGTV SEVLG KAFVS FDKDI RQNYW |
| 101 | PDSIR AQIAS LSAED KSILQ GYADG MNAWI DKVNA SPDKL LPQQF STFGF |
| 151 | KPKHW EPFDV AMIFV GTMAN RFSDS TSEID NLALL TALKD KYGKQ QGMAV |
| 201 | FNQLK WLVNP SAPTT IAARE SAYFL KFDLQ NTQTA ALLFR YDDPA PMLDR |
| 251 | PAEGT DGALL ALTAD QNRET IAAQF ACSGA NGLAQ YPTTS NNRVI GENKA |
| 301 | QQAKA IMVNG PQFGW YAPAY TYGIG LRGAG YDVTQ NTFFA YPGLV FGHNG |
| 351 | TISNG STAGF GDRVD IFARK LSAEK PGYYQ HNGEW VSMLS RKETI AVKDG |
| 401 | QEEFF TVWKT LHGNV IKTDT AUQTA YASAR AWDGK EVASL LAWTH QMKAK |
| 451 | HNPEW TQQAA KQALT INWYY ADVNG NIGYV HTGAY PDRQF GHDPR LPVFG |
| 501 | TGSND WKGLL SFDLM PKVYN FQSGY IANNN NSPQK DYPAS DLFAK LWGGA |
| 551 | DKVTR IDTIL DKQPR FTADQ AWDVI FQTSR BDLNL RLFLP ALKDA TANLA |
| 601 | ENDPR ROLVD KLASW DGENL VNDDG KTYQQ PGSAI LNAWL TSMLK RTVVA |
| 651 | AVPAP FGKWY BARGY KTTQD GFTGS LNISV QAKIL YEALQ GDKSP IFQAV |
| 701 | DLFGG KPQQE VILAA LDDAN QTLSK RYGND VTGWK TPAMA LTPKA NNFFG |
| 751 | VPQAA AKEAR HQAEY QNRST BNDMI VFSPT SGNRP VLAND VVAPG QSGFI |
| 801 | APIGK ADKHY DDQLI MYESF GFRSL WLTFQ DVDEH KESQF VIQVQ R |

ONE-STEP METHOD FOR SYNTHESIZING AMOXICILLIN FROM PENICILLIN OR SALT THEREOF THROUGH ENZYME CATALYSIS

CROSS REFERENCE TO THE RELATED APPLICATIONS

This application is based upon and claims priority to Chinese Patent Application No. 202411396024.3, filed on Oct. 8, 2024, the entire of which are incorporated herein by reference.

SEQUENCE LISTING

The instant application contains a Sequence Listing which has been submitted in XML format via EFS-Web and is hereby incorporated by reference in its entirety. Said XML copy is named FSJZ0101S_Sequence_Listing, created on Apr. 7, 2025, and is 18,407 bytes in size.

TECHNICAL FIELD

The present invention pertains to the technical field of semi-synthetic antibiotic preparation, specifically a one-step method for synthesizing amoxicillin from penicillin or a salt thereof through enzyme catalysis.

BACKGROUND

Amoxicillin, also known as hydroxy ampicillin, is a primary member of the second-generation penicillin antibiotics. As a broad-spectrum semi-synthetic antibiotic, it inhibits bacterial cell wall synthesis. Recommended by the World Health Organization (WHO) as the first-choice β-lactam oral antibiotic, amoxicillin exhibits high efficacy, broad antimicrobial activity, and minimal adverse effects.

Current synthetic approaches for amoxicillin include chemical synthesis and enzymatic catalysis. While chemical synthesis methods are well-established, they suffer from significant drawbacks: (1) prolonged reaction pathways resulting in low overall efficiency; (2) extensive use of organic solvents generating toxic byproducts with substantial environmental impact; and (3) low temperature operations leading to high energy consumption and elevated production costs. In contrast, enzymatic synthesis offers milder reaction conditions, environmental compatibility, and superior product quality, driving increased research and industrial adoption.

Conventional enzymatic synthesis employs a two-step process: first, hydrolytic penicillin acylase (PA) catalyzes the conversion of penicillin (or its salts) to 6-aminopenicillanic acid (6-APA), followed by a synthetic penicillin acylase mediated reaction of 6-APA with D-p-hydroxyphenylglycine or its methyl ester to yield amoxicillin (e.g., CN 201711221286.6 "Method for Direct Synthesis of Amoxicillin"; CN 201811490254.0 "Enzymatic Method for Synthesizing Amoxicillin"). This sequential methodology necessitates intermediate isolation, significantly increasing production costs and reducing efficiency. Recent advancements demonstrate one-pot synthesis using both hydrolytic penicillin acylases and synthetic penicillin acylases (WO 2022/195603); however, such systems require coordinated action of two distinct enzymes to achieve satisfactory results.

SUMMARY

To address the limitations of existing technologies, the present invention provides a method for single-enzyme, one-step synthesis of amoxicillin from penicillin G potassium. This method demonstrates rapid catalytic kinetics, high product yield, environmental compatibility through an aqueous-phase reaction system, and cost-effective industrial scalability.

The invention provides a one-step method for synthesizing amoxicillin from penicillin or a salt thereof through an enzyme catalysis, comprising using only one penicillin acylase mutant as a sole enzyme in a reaction system, using the penicillin or the salt thereof (preferably penicillin potassium) and D-p-hydroxyphenylglycine methyl ester as substrates, and carrying out a reaction in a buffer system of pH 4-8 (preferably pH range 4~7); wherein compared with the amino acid sequence shown in SEQ ID NO: 1, an amino acid sequence of the penicillin acylase mutant comprises at least one of the following mutations: F146αK, F24βR, F71βY, N241βK, G385βY, or G385βR.

Process specifically includes the following steps:
S1: adding a buffer solution of pH 4-8 to a reaction flask as a reaction buffer system;
S2: adding a penicillin potassium salt and the D-p-hydroxyphenylglycine methyl ester to the reaction buffer system, wherein a molar ratio of the penicillin potassium salt to the D-p-hydroxyphenylglycine methyl ester is 1:1-1:2, and stirring thoroughly; and
S3: adding an immobilized penicillin acylase mutant to the reaction buffer system, and reacting at a reaction temperature controlled at 12-30C°.

Preferably, wherein the buffer solution in the step S1 comprises any one of citric acid buffer, acetic acid buffer, phosphate buffered saline (PBS) buffer, sodium dihydrogen phosphate-citric acid buffer, sodium barbital-hydrochloric acid buffer, and pure water.

Preferably, wherein in the step S2, a concentration of the penicillin potassium salt is 50-200 mmol/L, and a concentration of D-p-hydroxyphenylglycine methyl ester is 50-400 mmol/L.

Preferably, wherein in the step S3, an amount of the immobilized penicillin acylase is 3000-30000 U/L, and a reaction time is 1-6 h.

Preferably, wherein after the step S3, the one-step method further comprises a step of recovering the immobilized penicillin acylase mutant.

Preferably, wherein the step of recovering the immobilized penicillin acylase mutant comprises:
S4: filtering out the immobilized penicillin acylase using a sieve; and
S5: adding 20-30 mL of deionized water per 10 g of the immobilized penicillin acylase, stirring for 5-10 min, and draining and repeatedly washing until drained water is clear and transparent and an immobilized penicillin acylase sample has no odor.

Preferably, wherein after the step S5, the one-step method further comprises S6: covering the immobilized penicillin acylase with a buffer solution containing a 0.5% o (m/v) p-hydroxybenzoate ester solution, and sealing and storing at 2-8C°.

Preferably, for long-term preservation, disinfecting the cleaned immobilized penicillin acylase mutant with a 5% % (m/v) glutaraldehyde solution, filtering out the immobilized penicillin acylase, covering the immobilized penicillin acylase with a buffer solution containing a 0.5% o p-hydroxybenzoate ester solution, and sealing and storing at 2-8C°.

In summary, the advantages and positive effects of the present invention are as follows: the invention utilizes a mutant penicillin acylase derived from *Kluyvera citrophila* as the exclusive biocatalyst, enabling direct one-step synthesis of amoxicillin from penicillin G potassium and D-p-hydroxyphenylglycine methyl ester with yields up to 100%. This method boasts rapid catalytic rates, high product yields, and an environmentally friendly pure aqueous reaction system that is cost-effective and offers good economic benefits.

DETAILED DESCRIPTION OF THE EMBODIMENTS

To provide a clear and comprehensive understanding of the objectives, technical solutions, and advantages of the present invention, the following detailed description is provided in conjunction with specific embodiments. Unless otherwise specified, all equipment and reagents used in the embodiments and experimental procedures are commercially available. The described embodiments are intended to illustrate but not limit the scope of the invention.

Based on the information disclosed herein, those skilled in the art may make various modifications to the precise embodiments of the invention without departing from the spirit and scope of the appended claims. It is understood that the scope of the invention is not limited to the specific processes, properties, or components described, as these embodiments and other descriptions are provided merely to exemplify particular aspects of the invention. In practice, any modifications to the disclosed embodiments that are obvious to those skilled in the art or related fields shall fall within the scope of the appended claims.

For clarity and to avoid limiting the scope of the invention, all numerical values expressing quantities, percentages, or other parameters in this application shall be interpreted as being modified by the term "about." Unless explicitly stated otherwise, all numerical parameters in the specification and claims are approximations that may vary depending on the desired properties sought to be achieved. These numerical parameters should be interpreted in light of the reported significant digits and conventional rounding techniques. As used herein, "about" means within +10% of a stated value or range, preferably within +5%.

Ambient temperature: Unless otherwise specified, experiments are conducted under ambient conditions (natural room temperature without additional cooling/heating), typically defined as 10 to 30° C., preferably 15 to 25° C.

Abbreviations: "min" (minute), "s" (second), "U" (enzyme activity unit), "mM" (millimolar per liter), "M" (molar per liter), "rpm" (revolutions per minute), "mol" (mole), "μg" (microgram), "mg" (milligram), "g" (gram), "μL" (microliter), "mL" (milliliter), "bp" (base pair), "LB medium" (Luria-Bertani medium), "Kan50" (medium containing 50 μg/mL kanamycin).

Unless specified, methods follow standard laboratory practices as described in *Molecular Cloning: A Laboratory Manual* (4th Edition, J. Sambrook and M. R. Green, translated by He Fuchu, Science Press, Beijing, 2017) and New England Biolabs (NEB) reagent kit instructions.

The present invention discloses one-step method for synthesizing amoxicillin from penicillin or a salt thereof through an enzyme catalysis. The method employs a mutant form of penicillin acylase (PA) derived from *Kluyvera citrophila* to catalyze the direct conversion of penicillin potassium salt to amoxicillin in a single reaction step. This technical solution provided by the present invention eliminates the need for intermediate separation, substantially simplifies the production process, enhances the yield of reaction products, significantly reduces production costs, and thereby introduces a revolutionary transformation to the amoxicillin synthesis industry. Below, the technical solution of the present invention will be clearly and completely described in conjunction with the embodiments of the present invention.

Embodiment 1

Figure 1:
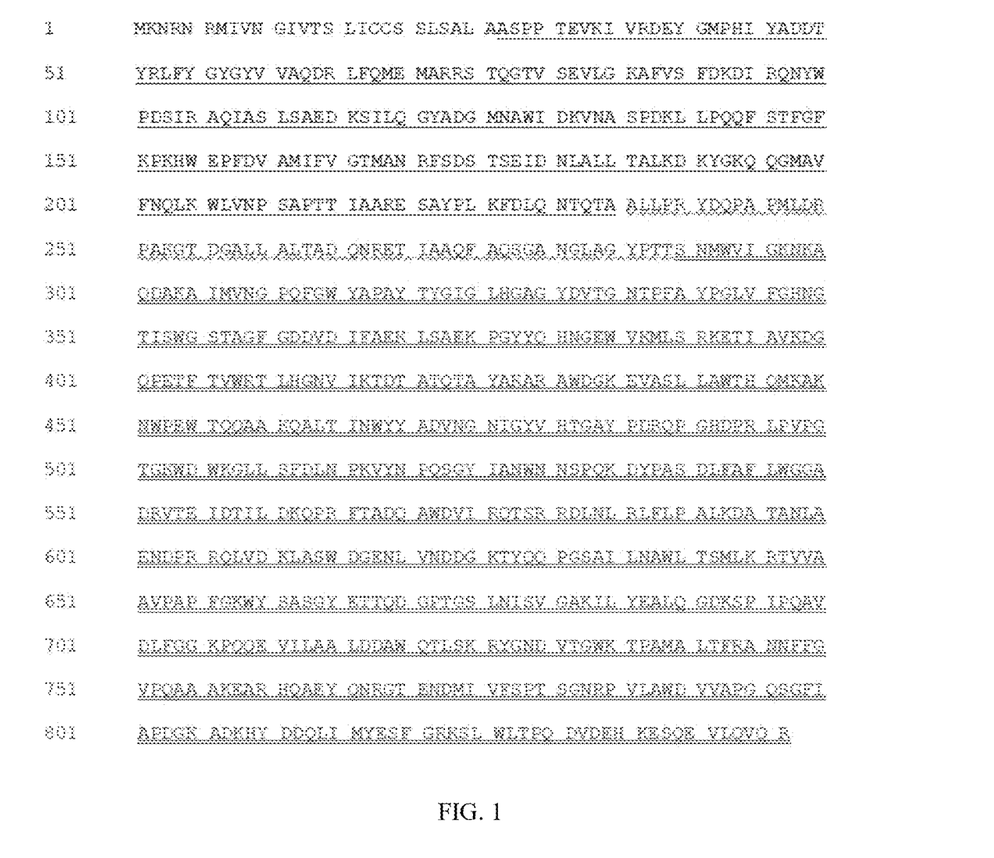
FIG. 1 shows the amino acid sequence (SEQ ID NO: 1) of the wild-type penicillin acylase.

Construction of the prokaryotic expression for the mutant of penicillin acylase from *Kluyvera citrophila*, and its functional characterization 1. Construction of wild-type PA expression vector pET 28a-kcPA The wild-type penicillin acylase used in this Embodiment originates from *Kluyvera citrophila* ATCC 21285. Its amino acid sequence (SEQ ID NO: 1) comprises four domains, the sequence from the N-terminus to the C-terminus of the protein is as follows: Signal peptide: Positions 1-26. α-subunit: Positions 27-235 (209 amino acids). Linker peptide: Positions 236-289 (54 amino acids). β-subunit: Positions 290-846 (557 amino acids). Refer to FIG. 1 for domain annotations (single underline: α-subunit; wavy line: linker; double underline: β-subunit). The nucleotide sequence is provided as SEQ ID NO: 2.

Figure 2:
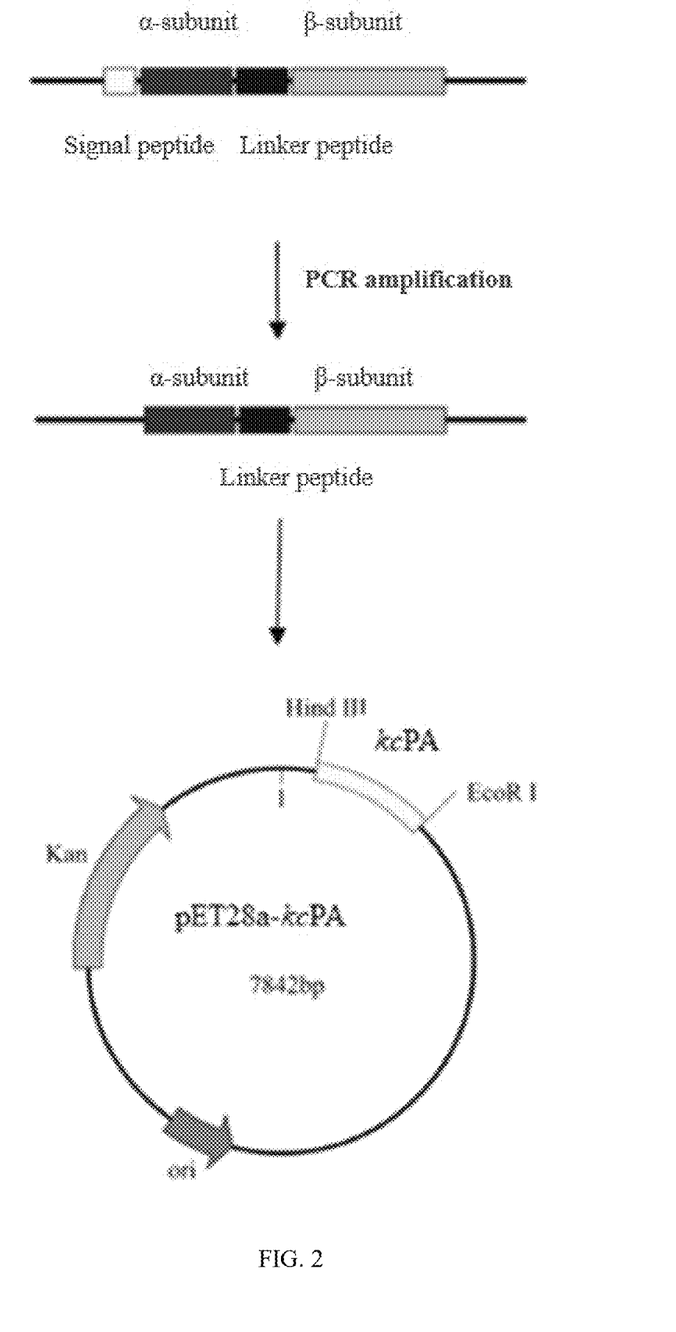
FIG. 2 is a schematic diagram of the construction of the recombinant plasmid pET28a-kcPA.

The recombinant plasmid pET 28a-kcPA was constructed as illustrated in FIG. 2. Using genomic DNA from *K. citrophila* ATCC 21285 as a template, primers were designed based on the nucleotide sequence of PA (SEQ ID NO: 2): Forward primer (SEQ ID NO: 3): 5'-CGG/AATT-CATGAAAAACCGCAATCGCAT-3'.

Reverse primer (SEQ ID NO: 4): 5'-CCA/AGCTTT-TAGCGCTGCACCTGCAGC-3'. EcoRI and HindiII restriction enzyme sites were introduced into the primer sequences (the underlined bases indicate the restriction enzyme recognition sites), and the target fragment of the wild-type PA was then amplified by PCR.

| PCR Reaction mixture | |
|---|---|
| Component | Volume |
| Sterile ddH$_2$O | 10 μL |
| template | 0.5 μL |
| Forward primer (10 μM) | 1 μL |
| Reverse primer (10 μM) | 1 μL |
| 2× Taq Polymerase | 12.5 μL |
| Total reaction volume | 25 μL |

PCR Thermal Cycling as following:

| | | |
|---|---|---|
| ①. 95° C. | | 5 min |
| ②. 95° C. | | 45 s |

-continued

| | | |
|---|---|---|
| ③. 60° C. | 50 s | |
| ④. 72° C. | 90 s | |
| ⑤. Go to ② | 30 cycles | |
| ⑥. 72° C. | 10 min | |
| ⑦. 4° C. | forever | |

The empty plasmid pET28a and PCR-amplified PA DNA fragment were subjected to double restriction enzyme digestion using EcoRI and HindIII restriction enzymes.

| Double enzyme digestion system: | |
|---|---|
| Component | Volume/Amount |
| 10× Buffer | 5 μL |
| EcoRI | 1.5 μL |
| HindIII | 1.5 μL |
| Empty vector or PCR product | 42 μL |
| Total | 50 μL |

The double restriction enzyme digestion was carried out at 37° C. for 1 hour, followed by enzyme inactivation at 80° C. for 20 minutes. The digested products were purified and quantified via agarose gel electrophoresis, yielding approximate concentrations of 50 ng/μL for the pET28a vector and 140 ng/μL for the kcPA insert.

The purified fragments were ligated using T4 DNA ligase in a 16° C. metal bath overnight to generate the recombinant plasmid pET28a-kcPA. The recombinant plasmid was introduced into competent E. coli DH5a cells via heat shock transformation.

Connection reaction system of the target fragment and the linearized vector:

| Component | Volume |
|---|---|
| 10× Buffer | 1 μL |
| T4 DNA ligase | 1 μL |
| Linearized vector | 4 μL |
| Insert fragment | 4 μL |
| Total | 10 μL |

Figure 3:
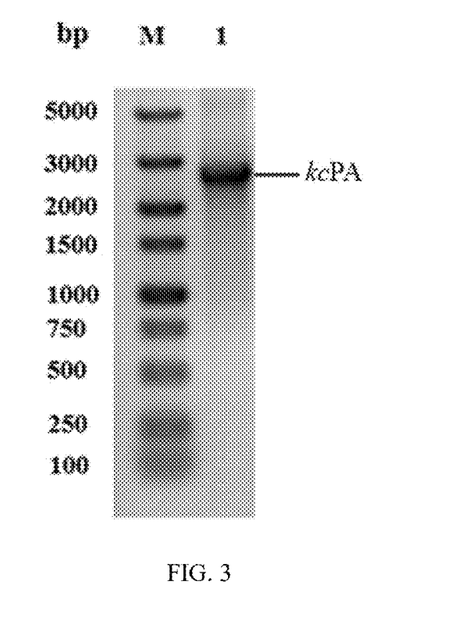
FIG. 3 displays the agarose gel electrophoresis analysis of the PCR-amplified recombinant plasmid.

To verify successful plasmid transformation, single colonies were picked from Kan50-LB agar plates and inoculated into Kan50-LB liquid medium. On the following day, plasmids were extracted using a plasmid extraction kit and subjected to PCR verification. A garose gel electrophoresis confirmed the presence of a 2500-bp target band (see FIG. 3). The validated expression vector pET28a-kcPA was then transformed into E. coli BL21 (DE3) to generate the recombinant strain E. coli BL21 (DE3)/pET 28a-kcPA for wild-type PA expression.

2. Generation of Mutant Expression Vectors

In this embodiment, a total of 18 mutants were obtained through site-directed mutagenesis, as shown in the table below. The notation "F146aK" indicates that the amino acid at position 146 on the a subunit was changed from F (Phenylalanine) to K (Lysine). The explanation for other mutation sites follows the same logic.

TABLE 1

| Mutants and Corresponding Mutation Sites | |
|---|---|
| Mutant ID | Mutation Sites |
| KcPA | Wild-type |
| KcPA 01-06 | Single-point mutants: F146αK, F24βR, F71βY, N241βK, G385βY, G385βR |
| KcPA 07-11 | Double-point mutants: F146αK combined with one of F24βR, F71βY, N241βK, G385βY, or G385βR |
| KcPA 12 | Triple-point mutant: F146αK & F24βR & F71βY |
| KcPA 13 | Triple-point mutant: F146αK & N241βK & G385βY |
| KcPA 14 | Triple-point mutant: F146αK & N241βK & G385βR |
| KcPA 15 | Triple-point mutant: F146αK & F71βY & N241βK |
| KcPA 16 | Quadruple-point mutant: F146αK & F71βY & N241βK & G385βY |
| KcPA 17 | Quintuple-point mutant: F146αK & F24βR & F71βY & N241βK & G385βY |
| KcPA 18 | Quintuple-point mutant: F146αK & F24βR & F71βY & N241βK & G385βR |

First, primers corresponding to each mutation site were designed. Then, Using the wild-type PA target fragment as the initial template, site-directed mutagenesis was performed with the NEB Q5® Site-Directed Mutagenesis Kit (Q5 SDM Kit). The primers for each mutation site are listed below (lowercase letters indicate mutated nucleotides):

```
F146αK,
Forward (F):
                                  SEQ ID NO: 5
5'-GGCGAACCGTaaaTCTGACAGCACCAG-3';

Reverse (R):
                                  SEQ ID NO: 6
5'-ATGGTGCCGACAAAAATCATCGCCA-3';

F24βR,
Forward (F):
                                  SEQ ID NO: 7
5'-TGGGCCGCAGcgcGGTTGGTATGCG-3';

Reverse (R):
                                  SEQ ID NO: 8
5'-TTGACCATAATGGCCTTCGCATCCT-3';

F71βY,
Forward (F):
                                  SEQ ID NO: 9
5'-CACCGCCGGTtatGGTGATGATG-3';

Reverse (R):
                                  SEQ ID NO: 10
5'-GATCCCCATGAAATGGTGCCGTTGT-3';

N241βK,
Forward (F):
                                  SEQ ID NO: 11
5'-CGCCAACTGGaaaAACTCGCCGC-3';

Reverse (R):
                                  SEQ ID NO: 12
5'-ATATAGCCCGACTGCGGGTTATACAC-3';

G385βY,
Forward (F):
                                  SEQ ID NO: 13
5'-CGGGCCAACCtatTCGCTGAACATCAGCGTG-3';

Reverse (R):
                                  SEQ ID NO: 14
5'-TCCTGGGTGGTTTCATAGCCACTGG-3';
```

-continued

G385βR,
Forward (F):
SEQ ID NO: 15
5'-CGGGCCAACCcgcTCGCTGAACATC-3';

Reverse (R):
SEQ ID NO: 16
5'-TCCTGGGTGGTTTCATAGCCACTGG-3';

The primers were synthesized by a nucleic acid synthesis company, then dissolved in sterile water before proceeding with the protocol according to the kit instructions. As following:

Step 1: Site-Directed Mutagenesis Via PCR
PCR Reaction mixture:

| Component | Volume |
| --- | --- |
| Q5 Hot Start High-Fidelity 2X Master Mix | 12.5 µL |
| 10 µM Forward Primer | 1.25 µL |
| 10 µM Reverse Primer | 1.25 µL |
| Template DNA (1-25 ng/µL) | 1 µL |
| Nuclease-Free Water | 9.0 µL |
| Total Volume | 25 µL |

Thermal Cycling Program:

| Step | Temperature | Time |
| --- | --- | --- |
| Initial Denaturation | 98° C. | 30 s |
| 25 Cycles | 98° C. | 10 s |
| | 68° C. | 10-30 s |
| | 72° C. | 62 s |
| Final Extension | 72° C. | 2 min |
| Hold | 4-10° C. | ∞ |

For mutants with ≥2 mutation sites, the PCR product from the prior mutation step was used as the template for subsequent rounds of site-directed mutagenesis.

Step 2: Kinase, Ligase & Dpnl (KLD) Treatment
Reaction Mixture:

| Component | Volume | Final Concentration |
| --- | --- | --- |
| PCR Product | 1 µL | |
| 2× KLD Reaction Buffer | 5 µL | 1× |
| 10× KLD Enzyme Mix | 1 µL | 1× |
| Nuclease-Free Water | 3 µL | |

Incubate at room temperature for 5 minutes.

Step 3: Heat Shock Transformation

Add 5 µL of the KLD reaction mixture to 50 µL of chemically competent E. coli BL21 (DE3) cells. Incubate on ice for 30 minutes, apply a 42° C. heat shock for 30 seconds, and return to ice for 5 minutes. Subsequently, add 950 µL of SOC sterile liquid medium and incubate at 37° C. with gentle shakingfor 1 hour. Spread 40-100 µL of the bacterial suspension onto Kan50-LB agar plates and incubate overnight at 37° C. The resulting single colonies represent the mutant expression strains, designated as E. coli BL21 (DE3)/pET28a-kcPA01~18.

Step 4: Mutant Verification

Inoculate the obtained mutant expression strains into 25 mL of LB liquid medium containing Kan50. Incubate at 37° C. overnight. Use a plasmid extraction kit to isolate the plasmid. Send the plasmid to a third-party biotech company for sequencing to confirm that the product is the intended point-mutated target product.

3. Expression of Wild-Type and Mutant KcPA

The recombinant strains E. coli BL21 (DE3)/pET28a-kcPA and E. coli BL21 (DE3)/pET28a-kcPA01~18 were inoculated onto Kan50 LB agar plates and incubated in a 37° C. incubator for 12-16 hours. Single colonies were picked and inoculated into 25 mL of LB liquid medium containing Kan50. These cultures were grown overnight at 37° C. with shaking at 300 rpm. Next, 500 µL of the bacterial suspension was transferred to 50 mL of Kan50 LB liquid medium and incubated at 37° C. with shaking at 280 rpm. The OD600 was monitored, and when it reached 0.6-0.8, IPTG was added to a final concentration of 0.3 mM to induce protein expression. The cultures were induced for 10 hours at 25° C. with shaking at 220 rpm. The cells were harvested by centrifugation, and the cell pellets were resuspended in pre-chilled PBS buffer (pH 7.5) and kept on ice for 10 minutes. The resuspended cells were then centrifuged at 4° C., 12,000 rpm for 6 minutes to collect the cell pellets. The cell pellets were further resuspended in 50 mM PBS buffer (pH 7.5), and after another round of centrifugation at 4° C., 12,000 rpm for 6 minutes, the supernatant was discarded, and the final cell pellets were resuspended at a concentration of 0.01 g/mL. The cells were lysed using a sonicator under the following conditions: ice-water bath, 400 W power, with cycles of 3 seconds on and 5 seconds off for a total of 80 cycles. After lysis, the mixture was centrifuged at 4° C., 12,000 rpm for 15 minutes, and the supernatant was collected as the crude enzyme extract. SDS-PAGE was then used to analyze the expressed proteins.

Figure 4:
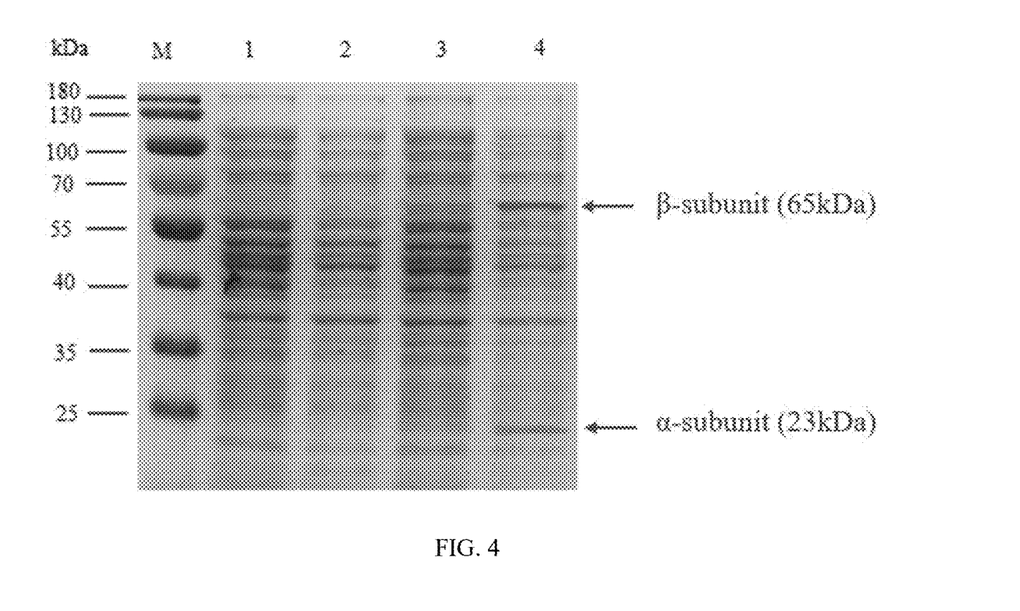
FIG. 4 presents the SDS-PAGE electrophoresis results of protein expression in E. coli BL21 (DE3)/pET28a-kcPA cells.

FIG. 4 shows the SDS-PAGE analysis of the protein expressed by the mutant strain E. coli BL21 (DE3)/pET28a-kcPA 18. The lanes are labeled as follows: M: Protein marker. Lane 1: Supernatant of E. coli BL21 (DE3)/pET28a. Lane 2: Supernatant of E. coli BL21 (DE3)/pET28a-kcPA without induction. Lane 3: Supernatant of E. coli BL21 (DE3)/pET 28a-kcPA 18 without induction. Lane 4: Supernatant of IPTG-induced E. coli BL21 (DE3)/pET28a-kcPA 18.

Embodiment 2

1. Measurement of KcPGA Hydrolytic Activity

Principle of Measurement: Penicillin G Potassium Salt (PGK) is hydrolyzed under the action of KcPA to produce 6-Aminopenicillanic Acid (6-APA) and phenylacetic acid. Under acidic conditions, 6-APA reacts with p-Dimethylaminobenzaldehyde (PDAB) to form a yellow-green substance that has a maximum absorption peak at 415 nm. The enzyme activity is defined as: in 0.1 M PBS buffer at 28° C., the amount of penicillin acylase required to catalyze the conversion of 20 mg/mL PGK into 1 µmol of 6-APA per minute is defined as KcPA enzyme activity one unit (U).

Weigh 0.5 g of PGK and dissolve it in the aforementioned buffer solution, then adjust the volume to 25 mL. Pipette 2 mL of PGK solution into a centrifuge tube and add 0.1 mL of KcPA enzyme solution. Set up a control without adding KcPA while keeping all other conditions identical.

Place the reaction system in a water bath shaker at 28° C. and 200 rpm for 10 minutes. After the reaction, deactivate the enzyme by placing it in a 90° C. water bath for 2 minutes. Then, take 200 µL of the post-reaction solution and add it to 3 mL of 0.1 M citrate buffer at pH 3.0, followed by the addition of 1 mL of coloring reagent (0.5% PDAB). Allow it to stand at room temperature for 3 minutes before measuring the absorbance at 415 nm. Use the 6-APA standard curve to determine the concentration of 6-APA in the sample, and calculate the enzyme activity, i.e. the hydrolytic activity, using the formula provided.

Calculation Formula: Hydrolytic activity of penicillin acylase per mL:

$$U = \frac{C_{6-APA} \times V}{t \times V_E}$$

Where, $C_{6-APA}$: Concentration of 6-APA in the sample, μmol/L; V: Volume of the reaction system, mL; VE: Volume of penicillin acylase added, mL; t: Reaction time, 10 min.

2. Measurement of KcPA Synthesis Activity

6-Aminopenicillanic Acid (6-APA) and D-p-Hydroxyphenylglycine methyl ester (D-HPGM) are catalyzed by KcPA to synthesize Amoxicillin. The amount of Amoxicillin can be measured using High-Performance Liquid Chromatography (HPLC), thereby calculating the synthesis activity of Penicillin Acylase (PA). The enzyme activity is defined as: under certain conditions, the amount of enzyme required to catalyze the production of 1 μmol of Amoxicillin per minute is considered one unit of synthesis activity, denoted as U.

Weigh 1 g of 6-APA and 1.25 g of D-HPGM and dissolve them in 50 ml of 0.1 M PBS buffer at pH 6.3. Adjust the pH to 6.3 and then make up to a total volume of 100 mL with the same buffer. Add 0.1 mL of KcPA enzyme solution to this mixture and incubate at 25° C. with shaking at 200 rpm for 30 minutes. Inactivate the enzyme by placing it in a 90° C. water bath for 2 minutes. Filter 0.5 mL of the reaction mixture through a 0.22 μm aqueous filter membrane and dilute with phosphate buffer to 100 mL for HPLC analysis to determine the concentration of Amoxicillin. The formula for calculating enzyme activity is provided below:

Calculation Formula: Synthesis activity of penicillin acylase per mL:

$$U = \frac{C_{sample} \times V \times 200}{V_E \times t}$$

Where, $C_{sample}$: Concentration of Amoxicillin, μmol/L; V: Volume of the reaction mixture, mL; 200: Dilution factor; VE: Volume of enzyme added, mL; t: Reaction time, min.

HPLC Conditions: Agilent ZORBAX SB-C18 4.6×250 mm column, column temperature 25° C. Injection volume 10 μL. Mobile phase A (0.02 M $NaH_2PO_4$—$Na_2HPO_4$ buffer at pH 4.7), mobile phase B (methanol). Start with 90% mobile phase A and 10% mobile phase B for 5 minutes, increase mobile phase B from 10% to 50% between 5 and 7 minutes, maintain 50% for 10 minutes, reduce mobile phase B from 50% to 10% between 17 and 19 minutes, and finally equilibrate with 90% mobile phase A and 10% mobile phase B for 5 minutes. Total flow rate is 1 mL/min.

TABLE 2

Comparison of Activities Between Mutants and Wild Type

| Mutant ID | Comparison of hydrolysis activity | Comparison of Synthesis Activity |
|---|---|---|
| KcPA | 100 | 100 |
| KcPA 01 | 580 | 1530 |
| KcPA 02 | 245 | 950 |
| KcPA 03 | 286 | 838 |
| KcPA 04 | 290 | 818 |
| KcPA 05 | 492 | 709 |
| KcPA 06 | 462 | 1118 |
| KcPA 07 | 745 | 2054 |
| KcPA 08 | 786 | 3037 |
| KcPA 09 | 664 | 2260 |
| KcPA 10 | 858 | 3574 |
| KcPA 11 | 920 | 4380 |
| KcPA 12 | 730 | 3410 |
| KcPA 13 | 953 | 8842 |
| KcPA 14 | 1074 | 10568 |
| KcPA 15 | 620 | 4875 |
| KcPA 16 | 831 | 8640 |
| KcPA 17 | 1270 | 12680 |
| KcPA 18 | 1440 | 15620 |

Note: The hydrolytic activity of recombinantly expressed wild-type KcPA is 15 U/mL (fermentation broth), and the synthesis activity is 80 U/mL. For ease of comparison, the enzyme activity of the wild-type K cPA is defined as 100 in Table 2, with each mutant's activity compared against this baseline.

From the table, it is evident that single-site mutants exhibit significantly enhanced hydrolytic and synthesis activities compared to the wild type, particularly F146αK on the a subunit and G385βR on the β subunit. Specifically, the single-point mutation F146αK shows 5.8 times higher hydrolytic activity and 15.3 times higher synthesis activity than the wild type. The G385βR mutant exhibits 4.6 times higher hydrolytic activity and approximately 11.2 times higher synthesis activity than the wild type. Comparing G385βY and G385βR mutants, the former has higher hydrolytic activity but not superior synthesis activity. When multiple mutations are combined, the enzyme activity increases significantly over single mutations, especially for the five-point mutant F146αK & F24βR & F71βY & N241βK & G385βR, which shows high levels of both hydrolytic and synthesis activities.

Embodiment 3

One-Step Synthesis of Amoxicillin Catalyzed by Wild-Type and Penicillin Acylase Mutants Using PGK In PBS buffer at pH 7.0, PGK was added to reach a concentration of 200 mM, along with D-p-Hydroxyphenylglycine Methyl Ester (D-HPGM) to achieve a final concentration of 300 mM. Enzyme was added at 30 U/ml (based on synthetic activity). The reaction was carried out at 28° C. with constant stirring for 3 hours. After the reaction, HPLC analysis was performed to calculate the yield of Amoxicillin.

HPLC Conditions: Agilent ZORBAX SB-C18 4.6×250 mm column, column temperature 25° C. Injection volume 10 μL. Mobile phase A (0.02 M $NaH_2PO_4$-$Na_2H PO_4$ buffer at pH 4.7), mobile phase B (methanol). Start with 90% mobile phase A and 10% mobile phase B for 5 minutes, increase mobile phase B from 10% to 50% between 5 and 7 minutes, maintain 50% for 10 minutes, reduce mobile phase B from 50% to 10% between 17 and 19 minutes, and finally equilibrate with 90% mobile phase A and 10% mobile phase B for 5 minutes. Flow rate is 1 mL/min.

Figure 5:
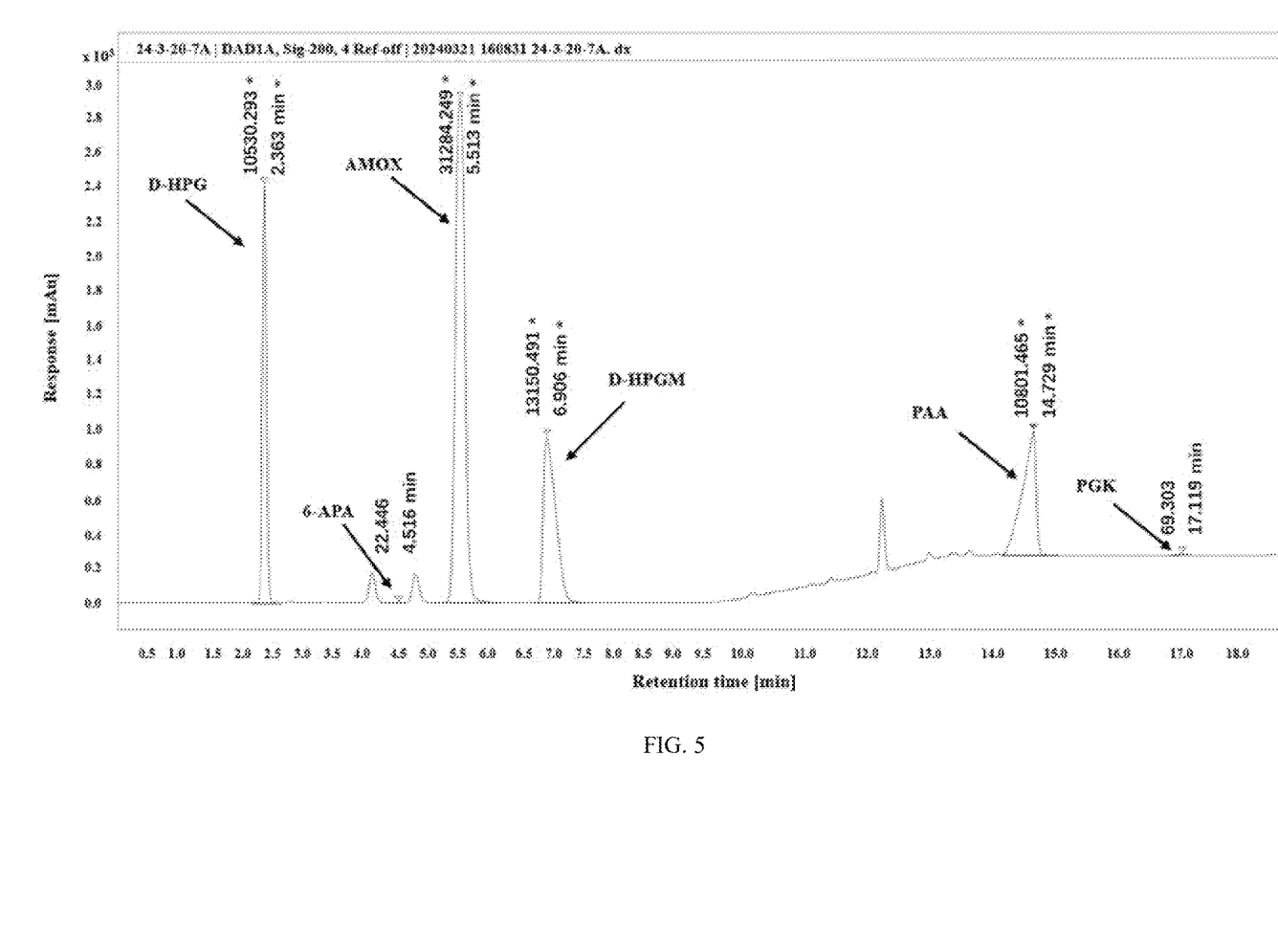
FIG. 5 illustrates the HPLC chromatogram of amoxicillin synthesized in a one-step reaction catalyzed by KcPA from penicillin potassium salt in Embodiment 3.

The reaction scheme is as follows:

For mutant K cPA 18, the HPLC detection spectrum is shown in FIG. 5, where D-HPG represents D-p-Hydroxyphenylglycine, AMOX represents Amoxicillin, D-HPGM represents D-p-Hydroxyphenylglycine Methyl Ester, PAA represents Phenylacetic Acid, and PGK represents Penicillin Potassium Salt. As can be seen from the figure, the content of the intermediate 6-A PA is extremely low, almost negligible.

TABLE 3

Yield of Amoxicillin Catalyzed by Various Mutants

| Mutant ID | Amoxicillin Yield/% |
|---|---|
| KcPA | 8.5 |
| KcPA 01 | 24.5 |
| KcPA 02 | 16.3 |
| KcPA 03 | 18.6 |
| KcPA 04 | 17.2 |
| KcPA 05 | 15.7 |
| KcPA 06 | 20.1 |
| KcPA 07 | 26.8 |
| KcPA 08 | 28.5 |
| KcPA 09 | 25.3 |
| KcPA 10 | 29.2 |
| KcPA 11 | 34.7 |
| KcPA 12 | 28.9 |
| KcPA 13 | 68.2 |
| KcPA 14 | 85.6 |
| KcPA 15 | 37.7 |
| KcPA 16 | 67.9 |
| KcPA 17 | 92.8 |
| KcPA 18 | 99.0 |

From the results in the table above, it is evident that all mutants are capable of catalyzing the reaction between potassium salt of penicillin and D-Hydroxyphenylglycine Methyl Ester in one step to synthesize Amoxicillin within a single reaction system. Moreover, the product yields are significantly higher compared to the wild type.

Embodiment 4

Preparation of Immobilized Penicillin Acylase

Penicillin acylase enzyme solution was prepared according to Embodiment 1. This enzyme solution was then added to epoxy resin (ER) activated with glutaraldehyde, and the cross-linking reaction was carried out at 15° C. for 1.5 hours. The cross-linking reaction system consisted of: 1200 U of enzyme solution, 0.25% glutaraldehyde, 5 g of ER, and 50 mL of phosphate buffer (KH 2PO 4-K2HPO$_4$) at pH 7.5. After the completion of the cross-linking reaction, the immobilized enzyme was collected by filtration using a sieve. The immobilized enzyme was then washed with 100 ml of phosphate buffer (pH 7.5). The activity of the immobilized enzyme was measured to be 180 U/g, with an immobilized enzyme activity recovery rate reaching 75%.

Embodiments 5-17 Optimization of Process Conditions for One-Step Synthesis of Amoxicillin Catalyzed by KcPGA 18 Using PGK The synthesis process includes the following steps:

(1) Add a certain amount of PBS buffer or other buffers with a pH range of 4 to 8 into a reaction flask as the reaction buffer system.

(2) Weigh a certain amount of Penicillin G Potassium Salt (PGK) and D-p-Hydroxyphenylglycine Methyl Ester (D-HPGM) and add them to the reaction buffer system. The molar ratio of PGK to D-HPGM is between 1:1 and 1:2, with PGK concentration ranging from 50 to 200 mmol/L and D-HPGM concentration ranging from 50 to 400 mmol/L. Stir thoroughly to ensure that PGK and D-HPGM substrates are uniformly dispersed in the solvent.

(3) Accurately weigh a certain amount of immobilized penicillin acylase with synthetic catalytic activity and add it to the reaction flask at an enzyme dosage of 3000 to 30000 U/L (based on synthetic enzyme activity). Control the reaction temperature between 12 and 30° C. and the reaction time between 1 to 6 hours.

(4) After the reaction ends, add 2 to 5 times the volume of deionized water to the reaction system, then slowly add 15% (w/v) phosphoric acid solution dropwise until the entire system becomes clear and transparent.

(5) Filter out the immobilized penicillin acylase and rinse it 2-3 times with deionized water. Mix the collected washing solution thoroughly with the filtrate.

(6) Soak the filtered immobilized penicillin acylase in deionized water for 15-20 minutes (during which 3-4 drops of phosphoric acid can be added to maintain weak acidity and enzyme activity), then rinse it 2-3 times with deionized water. Dry the surface moisture using blotting paper (or cold air drying) and store it in a refrigerator at 2-6° C. for reuse.

HPLC Detection Conditions: Same as Embodiment 3.

Experimental Results:

| Embodiment | Reaction System | PGK & D-HPGM (mmol/L) | Enzyme (U/L) | Reaction Conditions (Temp, Time) | Amoxicillin Yield (%) |
|---|---|---|---|---|---|
| Embodiment 5 | pH 4 citrate-sodium citrate buffer | 100, 200 | 3000 | 12° C., 6 h | 75 |
| Embodiment 6 | pH 5 acetate buffer | 150, 300 | 20000 | 28° C., 1.5 h | 80 |
| Embodiment 7 | pH 5 PBS buffer | 100, 150 | 10000 | 14° C., 5 h | 88 |
| Embodiment 8 | pH 6 PBS buffer | 100, 150 | 20000 | 16° C., 2 h | 90 |
| Embodiment 9 | pH 7 PBS buffer | 150, 200 | 25000 | 16° C., 2 h | 92 |
| Embodiment 10 | pH 7 PBS buffer | 200, 400 | 25000 | 24° C., 1 h | 85 |

| Embodiment | Reaction System | PGK & D-HPGM (mmol/L) | Enzyme (U/L) | Reaction Conditions (Temp, Time) | Amoxicillin Yield (%) |
|---|---|---|---|---|---|
| Embodiment 11 | pH 7 PBS buffer | 200, 400 | 25000 | 26° C., 2 h | 98 |
| Embodiment 12 | pH 7 PBS buffer | 200, 300 | 25000 | 26° C., 3 h | 98 |
| Embodiment 13 | pH 7 NaH2PO4-citrate buffer | 150, 300 | 25000 | 24° C., 2 h | 93 |
| Embodiment 14 | pH 7 citrate-sodium citrate buffer | 150, 300 | 25000 | 22° C., 1.5 h | 92 |
| Embodiment 15 | pH 7.5 PBS buffer | 200, 300 | 30000 | 20° C., 2 h | 94 |
| Embodiment 16 | pH 7 barbital sodium-HCl buffer | 150, 300 | 25000 | 20° C., 2.5 h | 95 |
| Embodiment 17 | Deionized water | 200, 300 | 20000 | 28° C., 4 h | 97 |

Embodiment 18 Enzyme Recovery and Reuse

The filtered immobilized penicillin acylase was soaked in deionized water for 20 minutes, with 20 to 30 mL of deionized water added per 10 g of immobilized enzyme. It was then stirred for 5 to 10 minutes, drained, and the washing process was repeated until the released water was clear and odorless. In the buffer used, a 0.5% o solution of hydroxybenzoate was added to cover the immobilized enzyme, which was then stored in a refrigerator at 4° C. for reuse.

Recovered enzyme was used in a reaction system containing PBS at pH 7, with PGK concentration of 200 mmol/L, D-HPGM concentration of 300 mmol/L, and an enzyme amount of 25000 U/L. The reaction was carried out at 26° C. for 3 hours, achieving an Amoxicillin yield of 98%.

Embodiment 19 Enzyme Recovery and Reuse

Following the procedure described: "The filtered immobilized penicillin acylase is soaked in deionized water for 20 minutes, with 20 to 30 mL of deionized water added per 10 g of immobilized enzyme. Stir for 5 to 10 minutes, drain, and repeat the cleaning process until the released water is clear and the enzyme sample is odorless," the enzyme was recovered and reused up to 20 times.

For each cycle, the recovered enzyme was used in a reaction system containing PBS at pH 7, with PGK concentration of 200 mmol/L, D-HPGM concentration of 300 mmol/L, and an enzyme amount of 25000 U/L. The reaction was performed at 26° C. for 3 hours, resulting in an Amoxicillin yield of 92%.

The above embodiments illustrate preferred embodiments of the invention and are not intended to limit it. Any modifications, equivalent substitutions, and improvements made within the spirit and principles of this invention shall fall within the scope of protection of this invention.

What is claimed is:

1. A one-step method for synthesizing amoxicillin from penicillin or a salt thereof through an enzyme catalysis, comprising using only one penicillin acylase mutant as a sole enzyme in a reaction system, using the penicillin or the salt thereof and D-p-hydroxyphenylglycine methyl ester as substrates, and carrying out a reaction in a reaction buffer system of pH 4-8; wherein the penicillin acylase mutant consists of an amino acid sequence identical to SEQ ID NO: 1 except for the following mutations: F146αK, F24βR, F71βY, N241βK, and G385βR.

2. The one-step method for synthesizing the amoxicillin from the penicillin or the salt thereof through the enzyme catalysis according to claim 1, comprising the following steps:

S1: adding a buffer solution of pH 4-8 to a reaction flask as the reaction buffer system;

S2: adding a penicillin potassium salt and the D-p-hydroxyphenylglycine methyl ester to the reaction buffer system, wherein a molar ratio of the penicillin potassium salt to the D-p-hydroxyphenylglycine methyl ester is 1:1-1:2, and stirring thoroughly; and S3: adding an immobilized penicillin acylase mutant to the reaction buffer system, and reacting at a reaction temperature controlled at 12-30° C.

3. The one-step method for synthesizing the amoxicillin from the penicillin or the salt thereof through the enzyme catalysis according to claim 2, wherein the buffer solution in the step S1 comprises any one of citric acid buffer, acetic acid buffer, phosphate buffered saline (PBS) buffer, sodium dihydrogen phosphate-citric acid buffer, sodium barbital-hydrochloric acid buffer, and pure water.

4. The one-step method for synthesizing the amoxicillin from the penicillin or the salt thereof through the enzyme catalysis according to claim 2, wherein in the step S2, a concentration of the penicillin potassium salt is 50-200 mmol/L, and a concentration of the D-p-hydroxyphenylglycine methyl ester is 50-400 mmol/L.

5. The one-step method for synthesizing the amoxicillin from the penicillin or the salt thereof through the enzyme catalysis according to claim 2, wherein in the step S3, an amount of immobilized penicillin acylase is 3000-30000 U/L, and a reaction time is 1-6 h.

6. The one-step method for synthesizing the amoxicillin from the penicillin or the salt thereof through the enzyme catalysis according to claim 2, wherein after the step S3, the one-step method further comprises a step of recovering the immobilized penicillin acylase mutant.

7. The one-step method for synthesizing the amoxicillin from the penicillin or the salt thereof through the enzyme catalysis according to claim 6, wherein the step of recovering the immobilized penicillin acylase mutant comprises:

S4: filtering out immobilized penicillin acylase using a sieve; and

S5: adding 20-30 mL of deionized water per 10 g of the immobilized penicillin acylase, stirring for 5-10 min, and draining and repeatedly washing until drained water is clear and transparent and an immobilized penicillin acylase sample has no odor.

* * * * *

UNITED STATES PATENT AND TRADEMARK OFFICE
CERTIFICATE OF CORRECTION

PATENT NO. : 12,473,580 B1
APPLICATION NO. : 19/189316
DATED : November 18, 2025
INVENTOR(S) : Yang et al.

Page 1 of 1

It is certified that error appears in the above-identified patent and that said Letters Patent is hereby corrected as shown below:

On the Title Page

Delete item (71) and item (72) and insert as follows:

-- (71) Applicant: XINGZHI COLLEGE ZHEJIANG NORMAL UNIVERSITY, Lanxi (CN)

(72) Inventors: Zhonghua Yang, Lanxi (CN); Xiaoyan Yin, Lanxi (CN) --

Signed and Sealed this
Tenth Day of February, 2026

John A. Squires
*Director of the United States Patent and Trademark Office*

SEQUENCE LISTING

```
Sequence total quantity: 16
SEQ ID NO: 1            moltype = AA   length = 846
FEATURE                 Location/Qualifiers
source                  1..846
                        mol_type = protein
                        organism = Kluyvera sp.
SEQUENCE: 1
MKNRNRMIVN  GIVTSLICCS  SLSALAASPP  TEVKIVRDEY  GMPHIYADDT  YRLFYGYGYV   60
VAQDRLFQME  MARRSTQGTV  SEVLGKAFVS  FDKDIRQNYW  PDSIRAQIAS  LSAEDKSILQ  120
GYADGMNAWI  DKVNASPDKL  LPQQFSTFGF  KPKHWEPFDV  AMIFVGTMAN  RFSDSTSEID  180
NLALLTALKD  KYGKQQGMAV  FNQLKWLVNP  SAPTTIAARE  SAYPLKFDLQ  NTQTAALLPR  240
YDQPAPMLDR  PAKGTDGALL  ALTADQNRET  IAAQFAQSGA  NGLAGYPTTS  NMWVIGKNKA  300
QDAKAIMVNG  PQFGWYAPAY  TYGIGLHGAG  YDVTGNTPFA  YPGLVFGHNG  TISWGSTAGF  360
GDDVDIFAEK  LSAEKPGYYQ  HNGEWVKMLS  RKETIAVKDG  QPETFTVWRT  LHGNVIKTDT  420
ATQTAYAKAR  AWDGKEVASL  LAWTHQMKAK  NWPEWTQQAA  KQALTINWYY  ADVNGNIGYV  480
HTGAYPDRQP  GHDPRLPVPG  TGKWDWKGLL  SFDLNPKVYN  PQSGYIANWN  NSPQKDYPAS  540
DLFAFLWGGA  DRVTEIDTIL  DKQPRFTADQ  AWDVIRQTSR  RDLNLRLFLP  ALKDATANLA  600
ENDPRRQLVD  KLASWDGENL  VNDDGKTYQQ  PGSAILNAWL  TSMLKRTVVA  AVPAPFGKWY  660
SASGYETTQD  GPTGSLNISV  GAKILYEALQ  GDKSPIPQAV  DLFGGKPQQE  VILAALDDAW  720
QTLSKRYGND  VTGWKTPAMA  LTFRANNFFG  VPQAAAKEAR  HQAEYQNRGT  ENDMIVFSPT  780
SGNRPVLAWD  VVAPGQSGFI  APDGKADKHY  DDQLIMYESF  GRKSLWLTPQ  DVDEHKESQE  840
VLQVQR                                                                  846

SEQ ID NO: 2            moltype = DNA  length = 2541
FEATURE                 Location/Qualifiers
source                  1..2541
                        mol_type = genomic DNA
                        organism = Kluyvera sp.
SEQUENCE: 2
atgaaaaata gaaatcgtat gatcgtgaac ggtattgtga cttccctgat ctgttgttct    60
agcctgtcag cgctggcggc aagcccgcca accgaggtta agatcgttcg cgatgaatac   120
ggcatgccgc atatttacgc cgatgatacc tatcgactgt tttacggcta tggctacgtg   180
gtggcgcagg atcgcctgtt ccagatggaa atggcgcgcc gcagtactca ggggaccgtc   240
tccgaggtgc tgggcaaagc attcgtcagt tttgataaag atattcgcca gaactactgg   300
ccggattcta ttcgcgcgca gatagcttcc ctctccgctg aggataaatc cattctgcag   360
ggctatgccg atggcatgaa tgcgtggatc gataaagtga acgccagccc cgataagctg   420
ttaccccagc agttctccac ctttggtttt aaacccaagc attgggaacc gtttgatgtg   480
gcgatgattt ttgtcggcac catggcgaac cgtttctctg acagcaccag cgaaattgat   540
aacctggcgc tgctgacggc gctaaaagat aaatacggca agcagcaggg catgcgggtc   600
tttaaccagc tgaaatggct ggttaatcct tccgcgccaa ccaccattgc ggcgcgggaa   660
agcgcctatc cgctgaagtt tgatctgcaa aacacgcaaa cggcggcgct gctgccgcgc   720
tacgaccagc cggcaccgat gctcgaccgc ccggcaaaag ggaccgatgg cgcgctgctg   780
gcgctgaccg ccgatcagaa ccgggaaact atcgccgcgc agttcgcgca aagcggcgct   840
```

-continued

```
aacggcctgg ctggctaccc gaccactagc aatatgtggg tgattggcaa aaacaaagcc    900
caggatgcga aggccattat ggtcaatggg ccgcagtttg gttggtatgc gccggcgtac    960
acctacggta tcgcctgca  cggcgcgggc tatgacgtca ccggcaatac gccgtttgcc   1020
tatccgggcc tcgtttttgg tcacaacggc accatttcat ggggatccac cgccggtttt   1080
ggtgatgatg tcgatatctt tgccgaaaaa ctttccgccg agaagccggg ctattaccag   1140
cataacggcg agtgggtgaa gatgttgagc cgcaaggaga ctattgcggt caaagacggc   1200
cagccggaga ccttaccgt  ttggcgcacg ctgcacggca acgtcattaa aaccgatact   1260
gcgacgcaga ccgccatgc  caaagcgcgc gcctgggatg caaagaggt  ggcgtccctg   1320
ctggcgtgga cgcaccagat gaaggccaaa aactggccgg agtggacgca gcaggcggcc   1380
aaaccggcgc tgaccattaa ctggtactac gccgatgtga acggcaatat cggctatgtg   1440
cataccggcg cctatccgga tcgccagccc ggccacgacc cgcgtttgcc ggttcccggc   1500
actgaaaat  gggactggaa agggttgctg tcgtttgatt tgaatccgaa agtgtataac   1560
ccgcagtcgg gctatatcgc caactggaac aactcgccgc aaaaagacta cccggcctct   1620
gatctgttcg cgttcctgtg gggcggtgcg gatcgagttg ctgagatcga cacgatcctc   1680
gataagcaac cgcgcttcac cgccgatcag gcgtgggatg tgatccgcca aaccagccgt   1740
cgggatctca acctgcggtt gttcttaccg gcgctgaagg acgccaccgc gaacctggcg   1800
gaaaacgatc cgcgccgcca actggtggat aaactgcgca gctgggacgg tgaaaacctt   1860
gtcaacgatg acggaaaaac ctatcagcaa ccgggatcgg cgattcttaa cgcctggctg   1920
accagcatgc tcaagcgcac ggtggttgcc gcggtcccag cgccgtttgg caagtggtac   1980
agcgccagtg gctatgaaac cacccaggac gggccaaccg gctcgctgaa catcagcgtg   2040
ggggcgaaaa tcctctacga agctctgcag ggtgataagt cgccaatccc gcaggcggtc   2100
gatctgtttg gcgggaaacc gcagcaggaa gtgatactgg cgacgctgct cgacgcttg   2160
cagacgctgt caaaacgcta cggtaacgac gtcaccggct ggaaaacccc tgccatggcc   2220
cttaccttcc gggccaataa cttcttcggc gtgccgcagg cggcagcaaa agaggcgcgt   2280
catcaggcgg agtaccagaa ccgcggtacg gaaaacgaca tgattgtctt ctcaccgacg   2340
tcgggtaacc gcccggttct tgcctgggat gtggtggcgc ccaggcaaag cggttttatc   2400
gcgccggatg gcaaagccga taagcactat gacgatcgc  tgataatgta cgagagcttt   2460
ggccgtaaat cgctgtggtt aacgcctcag gacgttgacg agcacaaaga gtctcaggaa   2520
gtgctgcagg tacagcgcta a                                             2541
```

```
SEQ ID NO: 3          moltype = DNA   length = 28
FEATURE               Location/Qualifiers
source                1..28
                      mol_type = other DNA
                      organism = synthetic construct
SEQUENCE: 3
cggaattcat gaaaaaccgc aatcgcat                                         28

SEQ ID NO: 4          moltype = DNA   length = 27
FEATURE               Location/Qualifiers
source                1..27
                      mol_type = other DNA
                      organism = synthetic construct
SEQUENCE: 4
ccaagctttt agcgctgcac ctgcagc                                          27

SEQ ID NO: 5          moltype = DNA   length = 27
FEATURE               Location/Qualifiers
source                1..27
                      mol_type = other DNA
                      organism = synthetic construct
SEQUENCE: 5
ggcgaaccgt aaatctgaca gcaccag                                          27

SEQ ID NO: 6          moltype = DNA   length = 25
FEATURE               Location/Qualifiers
source                1..25
                      mol_type = other DNA
                      organism = synthetic construct
SEQUENCE: 6
atggtgccga caaaaatcat cgcca                                            25

SEQ ID NO: 7          moltype = DNA   length = 25
FEATURE               Location/Qualifiers
source                1..25
                      mol_type = other DNA
                      organism = synthetic construct
SEQUENCE: 7
tgggccgcag cgcggttggt atgcg                                            25

SEQ ID NO: 8          moltype = DNA   length = 25
FEATURE               Location/Qualifiers
source                1..25
                      mol_type = other DNA
                      organism = synthetic construct
SEQUENCE: 8
ttgaccataa tggccttcgc atcct                                            25

SEQ ID NO: 9          moltype = DNA   length = 23
```

```
FEATURE              Location/Qualifiers
source               1..23
                     mol_type = other DNA
                     organism = synthetic construct
SEQUENCE: 9
caccgccggt tatggtgatg atg                                            23

SEQ ID NO: 10        moltype = DNA  length = 25
FEATURE              Location/Qualifiers
source               1..25
                     mol_type = other DNA
                     organism = synthetic construct
SEQUENCE: 10
gatcccatg aaatggtgcc gttgt                                           25

SEQ ID NO: 11        moltype = DNA  length = 23
FEATURE              Location/Qualifiers
source               1..23
                     mol_type = other DNA
                     organism = synthetic construct
SEQUENCE: 11
cgccaactgg aaaaactcgc cgc                                            23

SEQ ID NO: 12        moltype = DNA  length = 26
FEATURE              Location/Qualifiers
source               1..26
                     mol_type = other DNA
                     organism = synthetic construct
SEQUENCE: 12
atatagcccg actgcgggtt atacac                                         26

SEQ ID NO: 13        moltype = DNA  length = 31
FEATURE              Location/Qualifiers
source               1..31
                     mol_type = other DNA
                     organism = synthetic construct
SEQUENCE: 13
cgggccaacc tattcgctga acatcagcgt g                                   31

SEQ ID NO: 14        moltype = DNA  length = 25
FEATURE              Location/Qualifiers
source               1..25
                     mol_type = other DNA
                     organism = synthetic construct
SEQUENCE: 14
tcctgggtgg tttcatagcc actgg                                          25

SEQ ID NO: 15        moltype = DNA  length = 25
FEATURE              Location/Qualifiers
source               1..25
                     mol_type = other DNA
                     organism = synthetic construct
SEQUENCE: 15
cgggccaacc cgctcgctga acatc                                          25

SEQ ID NO: 16        moltype = DNA  length = 25
FEATURE              Location/Qualifiers
source               1..25
                     mol_type = other DNA
                     organism = synthetic construct
SEQUENCE: 16
tcctgggtgg tttcatagcc actgg                                          25
```